United States Patent [19]

Griffith

[11] Patent Number: 5,703,726
[45] Date of Patent: Dec. 30, 1997

[54] REVERSE TELEPHOTO LENS

[75] Inventor: John D. Griffith, Rochester, N.Y.

[73] Assignee: Eastman Kodak Company, Rochester, N.Y.

[21] Appl. No.: 631,500

[22] Filed: Apr. 12, 1996

Related U.S. Application Data

[60] Provisional application No. 60/003,269, Aug. 28, 1995.
[51] Int. Cl.⁶ .......................... G02B 13/04; G02B 13/18
[52] U.S. Cl. .......................... 359/753; 359/714; 359/715
[58] Field of Search .......................... 359/753, 752, 359/751, 750, 749, 714, 715

[56] References Cited

U.S. PATENT DOCUMENTS

| | | | |
|---|---|---|---|
| 2,341,385 | 2/1944 | Kingslake et al. | 88/57 |
| 2,821,112 | 1/1958 | Lautenbacher et al. | 88/57 |
| 3,369,853 | 2/1968 | Tolle | 359/753 |
| 3,731,989 | 5/1973 | Shimizu | 350/216 |
| 3,734,600 | 5/1973 | Shimizu | 359/753 |
| 4,257,678 | 3/1981 | Moniyama et al. | 350/465 |
| 4,333,714 | 6/1982 | Kreitzer | 350/460 |
| 4,421,390 | 12/1983 | Amano | 350/459 |
| 5,218,480 | 6/1993 | Moskovich | 359/753 |

Primary Examiner—Scott J. Sugarman
Attorney, Agent, or Firm—Svetlana Z. Short

[57] ABSTRACT

A reverse telephoto lens includes a front negative group of lens components having a front component with greater than normal separation from a rear positive group of lens elements. Preferably, the front negative group also includes a rear positive component that is meniscus concave to the front.

21 Claims, 8 Drawing Sheets

REVERSE TELEPHOTO LENS

CROSS REFERENCE TO RELATED APPLICATION

Reference is made to and priority claimed from U.S. Provisional Application Ser. No. US 60/003,269, filed 28 Aug. 1995, entitled REVERSE TELEPHOTO LENS.

BACKGROUND OF THE INVENTION

1. Field of the Invention

This invention relates to reverse telephoto lenses. Although the invention can be used in any application in which a reverse telephoto lens is applicable, it is particularly designed to use in electronic camera systems, particularly electronic camera systems incorporating array photodetectors and birefringent blur filters. These electronic cameras produce digital images that are passed on to a computer in digital form over a digital communication link.

2. Description of the Prior Art

Reverse telephoto lenses have found widespread use in single lens reflex cameras where they are commonly employed for short focal length lenses. Reverse telephoto designs are useful in these cameras because their long back focal length (back focus) provides clearance for a mirror located between the lens and the film plane. Such reverse telephoto single lens reflex camera lenses have a ratio of the back focal length over the effective focal length between 1.00 and 1.5, typically 1.15.

Early designs used a single negative element for the front negative group. The positive rear group was either a four element group (U.S. Pat. No. 2,341,385) or a triplet (U.S. Pat. No. 2,821,112). More recent designs, such as U.S. Pat. No. 3,731,989, have added a positive element to the negative front group and provide good correction at relative apertures of f/2.8 and semi-field angles greater than 30 degrees. The lenses disclosed in this prior patent are of the form —+ stop —++ from the object [or front] side, where the first lens is meniscus convex to the object side, the second lens is biconvex, the third lens is biconcave, the fourth lens is meniscus concave to the object side, and the fifth lens is biconvex. Designs of the same general form with a compound second element include U.S. Pat. No. 4,257,678 and U.S. Pat. No. 4,333,714.

A major concern in the design of lenses for these cameras has been to keep the lenses as compact as possible. The ratio of the vertex to vertex lens length over the effective focal length typically falls between 0.9 and 1.5.

Another application of reverse telephoto designs has been for compact video camera lenses. In U.S. Pat. No. 4,421,390 a nine element design comprising a three element negative group followed by the aperture stop and then by a six element positive group is disclosed. This is an f/1.4 design covering a semi-field of 35 degrees. The ratio of the back focal length over the effective focal length is 1.8. This design is much less compact than the 35 mm format single lens reflex camera lenses; the ratio of the vertex to vertex lens length over the effective focal length is 6.8.

SUMMARY OF THE INVENTION

I know of no prior art relating to the design of reverse telephoto lenses specifically for use with digital electronic cameras.

I found lenses for use with digital electronic cameras have some different requirements than those for film cameras or for prior video cameras. These requirements are discussed in the description of the preferred embodiments below.

It is an object of the present invention to provide reverse telephoto lens systems of generally high quality and especially usable in digital electronic cameras.

The above and other objects are provided by a reverse telephoto lens having lens elements arranged from a front, object side to a rear image side. A front negative group includes a front negative component and a rear positive component separated by a first airspace. A rear positive group is separated from the front negative group by a second airspace. A stop is located in the second airspace. The distance between the front negative component and the rear positive group is at least 2.5 times the focal length of the lens. According to preferred embodiments, this latter distance is greater than four times the focal length of the lens.

According to another preferred embodiment, the first airspace is between one and two times the focal length of the lens an the second airspace is between 1.5 and three times the focal length of the lens.

According to another preferred embodiment, the rear positive component of the front group is a single meniscus element which is concave to the object and the front negative component is a single meniscus element, convex to the object, providing a thick negative biconvex airspace between them.

Other preferred embodiments will be defined and explained below. The preferred embodiments, in addition to being of generally high quality and suitable for many uses, are particularly suitable for use with electronic cameras which produce digital images as output, particularly electronic cameras incorporating birefringent blur filters and array photodetectors in their design.

DESCRIPTION OF THE PREFERRED EMBODIMENTS

The back focal length requirement for electronic camera lenses can be even more demanding than for 35 mm single lens reflex camera lenses with equivalent field coverage. Birefringent quartz blur filters are inserted between the rear vertex of the camera lens and the array photodetector to prevent luminance and color aliasing. The space requirements of the birefringent blur filter, a photodetector cover glass, and their associated mechanical mounting components require that the lens have a long back focal length. In addition, the distance between the array photodetector cover glass and the array photodetector itself must be large enough to prevent scratches and other imperfections on the cover glass from being sharply imaged on the array photodetector (or a very high quality cover obtained).

For example, a lens designed for use with an army photodetector having 640×480 pixels on 0.0074 mm centers prefers a back focal length of up to 7.5 mm to accommodate the birefringent blur filter, the photodetector cover glass, their associated mount components, and the air space between the cover glass and the array photodetector required to minimize the effects of cover glass imperfections on the recorded image. This lens typically has an effective focal length of 5.4 mm to achieve the same field coverage as a 40 mm lens used on a 35 mm film camera. The ratio of the back focal length over the effective focal length is 1.40 for the electronic camera lens and 1.15 for the 35 mm single lens reflex camera lens. Thus, the electronic camera has a more demanding back focal length requirement for equivalent field coverage.

If imperfections in the cover glass can be controlled, the back focal length requirement can be reduced to that necessary for the space requirements of the birefringent blur filter, the photodetector cover glass, and their associated mounting components. Under these conditions, the 7.5 mm back focal length preference given in the previous example can be reduced to 6.3 mm. The ratio of back focal length over effective focal length can thereby be reduced to about 1.15, which is equivalent to the ratio for 35 mm format single lens reflex cameras. This is a feasible but less desirable solution because losing control of the quality of the cover glass can produce a high scrap rate for the array photodetector, which is generally among the most expensive components in the camera.

Lenses for use in electronic cameras also require a higher relative illumination in the corner than lenses for fill cameras because the dynamic range of electronic photodetectors is smaller than photographic film. This requirement limits the amount of vignetting that can be tolerated and makes the design more demanding. Lenses for fill cameras typically meet a 25% to 30% relative illumination requirement at the maximum field angle. All the embodiments of the invention provide at least 45% relative illumination at the maximum field angle.

The short focal length lenses used in electronic cameras require small lens elements. Manufacture of these lens elements using glass or plastic molding techniques can offer significant cost savings over conventional grind and polish techniques. However, using molding technology to manufacture the lens elements imposes restrictions on the glass choice used in the lens design. Several embodiments of the invention use glass choices which are compatible with current glass molding technology. In some cases, aspheric surfaces compatible with current glass molding technology are used to improve performance of the design.

Lenses for use in electronic cameras have back focal length requirements that are similar to lenses used in video camcorders since both systems use array photodetectors and birefringent blur filters. Video camcorders lenses also have a large ratio of lens length over focal length because of their short focal lengths. However, the image quality requirements of electronic cameras are more demanding than those for video camcorders. Image quality of video camcorders is limited by recording standards for consumer video tape and broadcast television standards. Electronic cameras images are stored in digital form and are not limited by video tape recording standards. The digital images from electronic cameras are viewed on high-resolution computer displays that are not limited by broadcast television standards. Digital images from electronic cameras are also used to create near photographic quality prints using a variety of printing technologies. All embodiments of the invention have high image quality that is suitable for use with digital electronic photography systems.

According to preferred embodiments of the invention, reverse telephoto lenses are provided having relative apertures of f/2.8, semi-field angles of 29 to 32 degrees, back focal lengths between 1.10 and 1.60 times their effective focal length, and provide high relative illumination at the edge of their field of view. They are comprised of five elements and have the form (−+ stop +−+). The lenses are corrected for use with plane parallel plates, representing the birefringent blur filter and array photodetector cover glass, located between the last lens element and the image plane. The rear three elements can be moved with respect to the first two elements and the stop to focus.

In several of the embodiments, the first lens element is negative meniscus with its convex side toward the object. The second lens element is positive meniscus with its concave side toward the object providing a strong biconvex negative airspace to the front of the lens.

The third and fifth element are positive biconvex. The fourth element is negative biconcave. Several embodiments of this form incorporate an aspheric surface in the rear group.

Throughout this discussion, the bending of an element is defined as:

$$X = \frac{C_1 + C_2}{C_1 - C_2},$$

where $C_1$ and $C_2$ are the curvatures of the first and second radii of the element. The radii R and distances D are numbered from front (object side) to rear and are in millimeters. The indices N and Abbe numbers V are also numbered from front to rear. The indices are for the D line of the spectrum.

According to further preferred embodiments of the invention (see, especially, Examples 1–3), the reverse telephoto lens satisfies the inequalities set out in the next few paragraphs:

$$45 \leq V_1 \leq 55 \tag{1}$$

$$30 \leq V_2 \leq 55 \tag{2}$$

$$44 \leq V_3 \leq 55 \tag{3}$$

$$28 \leq V_4 \leq 33 \tag{4}$$

$$39 \leq V_5 \leq 65 \tag{5}$$

In Equation (1), if the Abbe number is less than 45, the astigmatism in the resulting design is difficult to correct. An Abbe number of 55 is at the edge of the glass chart for the preferred index; a design using it for the first element can be adequately corrected. In Equation (2), if the Abbe number is less than 30, the coma in the resulting design is difficult to correct. If it is allowed to exceed 55, the astigmatism in the resulting design is undesirably high. In Equation (3), if the Abbe number is less than 44, more lateral color is induced into the design. An Abbe number of 55 is at the edge of the glass chart for the preferred index; a design using it for the third element can be adequately corrected. In Equation (4), if the Abbe number exceeds 33, significant lateral color is induced into the design. An Abbe number of 28 is at the edge of the glass chart for this index; a design using it for the fourth element can be adequately corrected. In Equation (5), if the Abbe number is less than 39, significant lateral color will be induced into the design. If it is allowed to exceed 65, the astigmatism in the resulting design is difficult to correct.

$$-3.20 \leq \frac{efl_1}{efl} \leq -2.41 \quad (6)$$

$$4.97 \leq \frac{efl_2}{efl} \leq 9.80 \quad (7)$$

$$0.79 \leq \frac{efl_3}{efl} \leq 1.23 \quad (8)$$

$$-0.82 \leq \frac{efl_4}{efl} \leq -0.53 \quad (9)$$

$$1.00 \leq \frac{efl_5}{efl} \leq 1.50 \quad (10)$$

where $efl_n$ is the effective focal length of the nth element, and efl is the focal length of the lens.

In Equation (6), if the ratio is less than $-3.20$, the spherical aberration and lateral color in the resulting design is difficult to correct. If the ratio exceeds $-2.41$, the lateral color in the resulting design is difficult to correct. In Equation (7), if the ratio is less than 4.97, the lateral color and astigmatism in the resulting design are difficult to correct. If the ratio exceeds 9.80, the lateral color is difficult to correct. In Equation (8), if the ratio is less than 0.79, the coma and field curvature in the design is difficult to correct. If the ratio exceeds 1.23, the spherical aberration in the resulting design is difficult to correct. In Equation (9), if the ratio is less than $-0.82$, the spherical aberration in the resulting design is difficult to correct. If the ratio exceeds $-0.53$, the field curvature in the resulting design is difficult to correct. In Equation (10), if the ratio is less than 1.0, the astigmatism in the resulting design is difficult to correct. If the ratio exceeds 1.50, the field curvature in the resulting design is difficult to correct.

$$-3.05 \leq X_1 \leq -2.17 \quad (11)$$

$$-11.3 \leq X_2 \leq -4.3 \quad (12)$$

$$0.22 \leq X_3 \leq 0.74 \quad (13)$$

$$-0.40 \leq X_4 \leq 0.19 \quad (14)$$

$$-0.75 \leq X_5 \leq 0.00 \quad (15)$$

Maintaining Equation (11), helps correct the lateral color astigmatism, spherical aberration and astigmatism. Maintaining Equation (12), helps correct astigmatism. Maintaining Equation (13), helps correct the spherical aberration and coma. Maintaining Equation (14), maintains the field curvature and helps correct astigmatism. Maintaining Equation (15), helps correct the coma, field curvature, and astigmatism. Maintaining Equation (15) also helps maintain the field curvature.

$$1.00 \leq \frac{D_2}{efl} \leq 2.00 \quad (16)$$

$$1.46 \leq \frac{D_4}{efl} \leq 2.37 \quad (17)$$

-continued $$0.12 \leq \frac{D_5}{efl} \leq 0.41 \quad (18)$$

$D_2$ is the air space between the first and second elements. Maintaining Equation (16) helps correct astigmatism, distortion and coma. $D_4$ is the air space between the second element and the stop. Maintaining Equation (17) helps correct coma, spherical aberration and astigmatism. $D_5$ is the air space between the stop and the third element. Maintaining Equation (18) helps correct astigmatism, spherical aberration and lateral color.

Perhaps more significantly, and very much unlike SLR designs, the overall corrections can be improved with less vignetting if the distance between the front negative component and the rear positive group is at least 2.5 times the focal length of the lens and preferably is greater than four times the focal length of the lens.

EXAMPLE I

Example I of the invention is a reverse telephoto design having the form (−+ stop +−+), where the first element is meniscus with the convex side towards the object, the second element is meniscus with the concave side toward the object, the third element is biconvex, the fourth element is biconcave, and the fifth element is biconvex. The lens is corrected for use with a birefringent blur filter array photodetector cover glass located behind the lens. The ratio of the back focal length over the effective focal length is 1.19 and the ratio of the lens length over the effective focal length is 4.64. The f-number is f/2.84 and the lens covers a total field angle of 64°. The focal length is 6.84 mm and the lens is suitable for use with an array photodetector having a semidiagonal of 4.15 mm.

Example I satisfies Equations (1) through (18).

Figure 1:
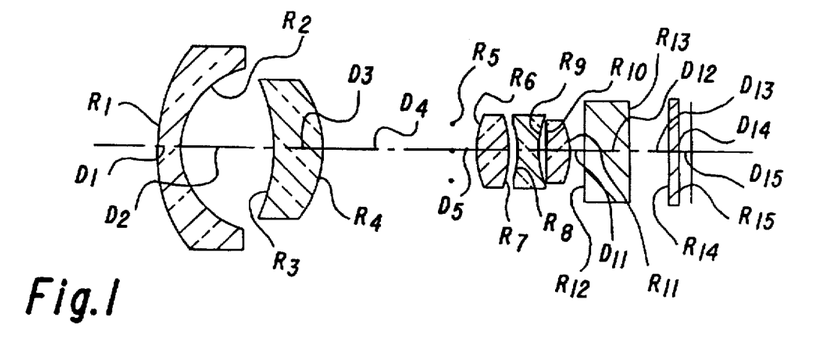
FIG. 1 is a cross section of Example 1 of the invention.
Figure 2:
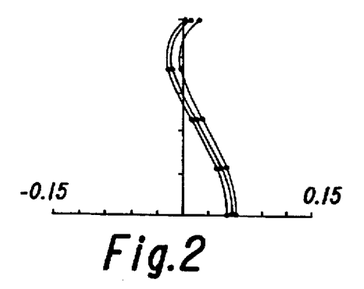
FIGS. 2, 3, 4, and 5 are graphical illustrations of longitudinal spherical aberration, astigmatism, distortion, and lateral color, respectively, of Example 1.
Figure 3:
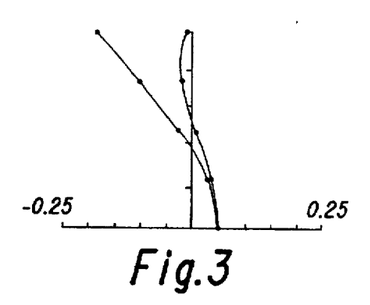
Figure 4:
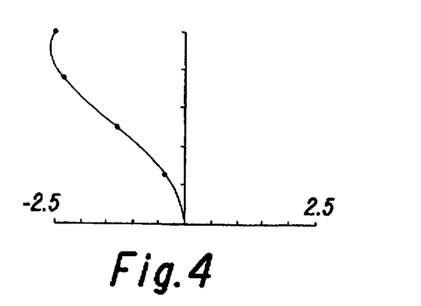
Figure 5:
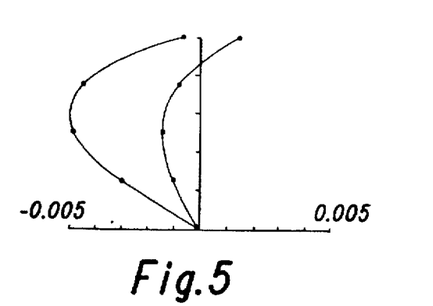

Table 1 below gives numerical values for Example I. FIG. 1 is a cross section of Example 1. FIGS. 2, 3, 4, and 5 are graphical illustrations of the various aberrations of Example 1. FIG. 2, 3, 4, and 5 show the longitudinal spherical aberration, astigmatism, distortion, and lateral color respectively. In FIGS. 1b and 1e the primary wavelength is e, the short wavelength is F, and the long wavelength is C. In this example, vignetting is controlled on the rear surface of the second element and the front surface of the fourth element. The clear apertures of these surfaces are restricted to 10.89 mm and 3.80 mm respectively. The image plane illuminance at the maximum field angle is 51% of the axial illuminance when vignetting and $\cos^4$ fall-off are taken into account.

The two plano-plano elements following the fifth lens element model the birefringent blur filter and array photodetector cover glass for the purposes of lens design. The blur filter is modeled here using a single isotropic material rather than a sandwich of birefringent materials. The performance of an imaging system comprising the lens and birefringent blur filter depends on the construction details of the birefringent blur filter. This can be computed using well-known methods. The aberration plots presented in FIG. 1 are computed using the numerical values given in the table below. The values of D11, D13, and D15 can be adjusted without affecting the performance of the design, provided their sum is held constant. The lens can be focused by moving the three elements behind the stop; D5 and D11 are adjusted such that their sum is constant.

TABLE 1

| efl = 6.84 | F number = 2.84 | Full field = 64° | Back focal length = 8.15 |
|---|---|---|---|
| R1 = 13.43 | D1 = 1.75 | N1 = 1.77250 | V1 = 49.6 |
| R2 = 6.49 | D2 = 7.23 | | |
| R3 = −12.19 | D3 = 3.68 | N3 = 1.58215 | V3 = 42.1 |
| R4 = −9.51 | D4 = 10.06 | | |
| R5 = 0.00 | D5 = 1.75 | | |
| R6 = 6.42 | D6 = 2.60 | N6 = 1.77250 | V6 = 49.6 |
| R7 = −10.05 | D7 = 0.60 | | |
| R8 = −5.89 | D8 = 1.50 | N8 = 1.72825 | V8 = 28.4 |
| R9 = 5.89 | D9 = 0.70 | | |
| R10 = 30.92 | D10 = 1.86 | N10 = 1.65113 | V10 = 55.9 |
| R11 = −6.56 | D11 = 1.05 | | |
| R12 = 0.00 | D12 = 3.56 | N12 = 1.54430 | V12 = 70.2 |
| R13 = 0.00 | D13 = 3.00 | | |
| R14 = 0.00 | D14 = 0.76 | N14 = 1.53338 | V14 = 61.3 |
| R15 = 0.00 | D15 = 1.32 | | |

EXAMPLE 2

Example 2 of the invention is a reverse telephoto design having the form (−+ stop +−+), where the first element is meniscus with the convex side towards the object, the second element is meniscus with the concave side toward the object, the third element is biconvex, the fourth element is biconcave, and the fifth element is biconvex. The lens is corrected for use with a birefringent blur filter array photodetector cover glass located behind the lens. The ratio of the back focal length over the effective focal length is 1.19 and the ratio of the lens length over the effective focal length is 5.19. The f-number is f/2.84 and the lens covers a total field angle of 64°. The focal length is 6.83 mm and the lens is suitable for use with an array photodetector having a semi-diagonal of 4.15 mm. The elements in this design are optimized for fabrication by molding.

Example 2 satisfies Equations (1) through (18).

Figure 6:
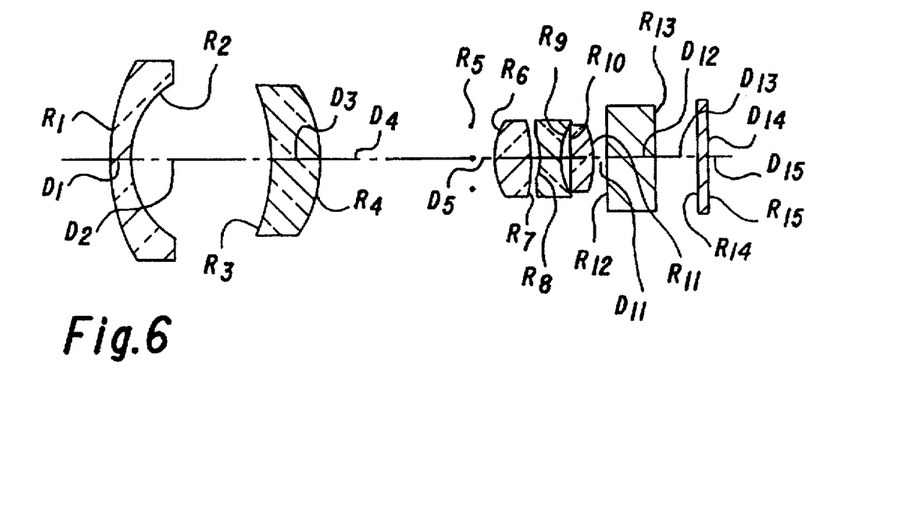
FIGS. 6 through 10 are a cross section and graphical illustrations of the aberrations of Example 2 of the invention.
Figure 7:
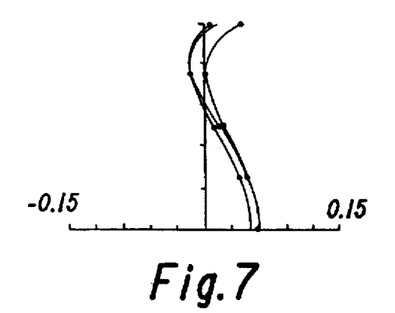
Figure 8:
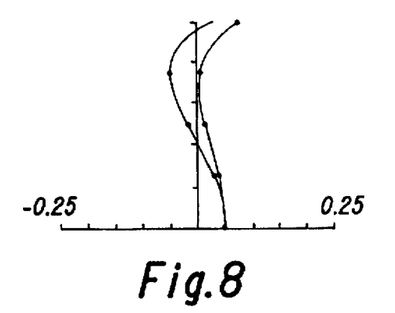
Figure 9:
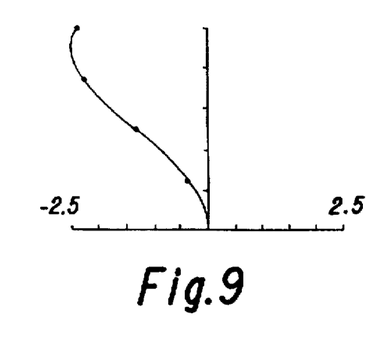
Figure 10:
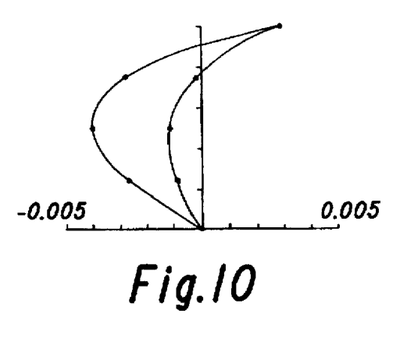

Table 2 gives numerical values for Example II. FIG. 6 is a cross section of Example 2 and FIGS. 7 through 10 are graphical illustrations of the various aberrations of Example II. In this example, vignetting is controlled on the front surface of the fourth element. The clear aperture of this surface is restricted to 3.64 mm. The image plane illuminance at the maximum field angle is 50% of the axial illuminance when vignetting and $\cos^4$ fall-off are taken into account. The two plano-plano elements following the fifth lens element model the birefringent blur filter and array photodetector cover glass for the purposes of lens design. The aberration plots presented in FIGS. 5–10 are computed using the numerical values given in the table below. The values of D11, D13, and D15 can be adjusted without affecting the performance of the design, provided their sum is held constant. The lens can be focused by moving the three elements behind the stop; D5 and D11 are adjusted such that their sum is constant.

TABLE II

| efl = 6.84 | F number = 2.84 | Full field = 64° | Back focal length = 8.15 |
|---|---|---|---|
| R1 = 15.54 | D1 = 1.50 | N1 = 1.72800 | V1 = 50.6 |
| R2 = 6.83 | D2 = 10.29 | | |
| R3 = −13.56 | D3 = 3.68 | N3 = 1.72800 | V3 = 50.6 |
| R4 = −10.18 | D4 = 11.09 | | |
| R5 = 0.00 | D5 = 1.74 | | |
| R6 = 5.75 | D6 = 2.60 | N6 = 1.72800 | V6 = 50.6 |

TABLE II-continued

| efl = 6.84 | F number = 2.84 | Full field = 64° | Back focal length = 8.15 |
|---|---|---|---|
| R7 = −19.53 | D7 = 0.57 | | |
| R8 = −8.50 | D8 = 1.50 | N8 = 1.72595 | V8 = 28.3 |
| R9 = 5.02 | D9 = 0.60 | | |
| R10 = 16.14 | D10 = 1.86 | N10 = 1.64673 | V10 = 55.5 |
| R11 = −7.60 | D11 = 1.05 | | |
| R12 = 0.00 | D12 = 3.56 | N12 = 1.54430 | V12 = 70.2 |
| R13 = 0.00 | D13 = 3.00 | | |
| R14 = 0.00 | D14 = 0.76 | N14 = 1.53338 | V14 = 61.3 |
| R15 = 0.00 | D15 = 1.32 | | |
| R16 = 0.00 | D16 = −0.05 | | |

EXAMPLE 3

Example 3 of the invention is a reverse telephoto design having the form (−+ stop +−+), where the first element is a biconcave len element, the second element is meniscus with the concave side toward the object, the third element is biconvex, the fourth element is biconcave, and the fifth element is biconvex. The third and fourth element form a cemented doublet. The lens is corrected for use with a birefringent blur filter and an array photodetector cover glass located behind the lens. The ratio of the back focal length over the effective focal length is 1.19 and the ratio of the lens length over the effective focal length is 5.07. The f-number is f/2.84 and the lens covers a total field angle of 64°. The focal length is 6.83 mm and the lens is suitable for use with an array photodetector having a semi-diagonal of 4.15 mm.

Example 3 satisfies Equations (1) through (5).

Figure 11:
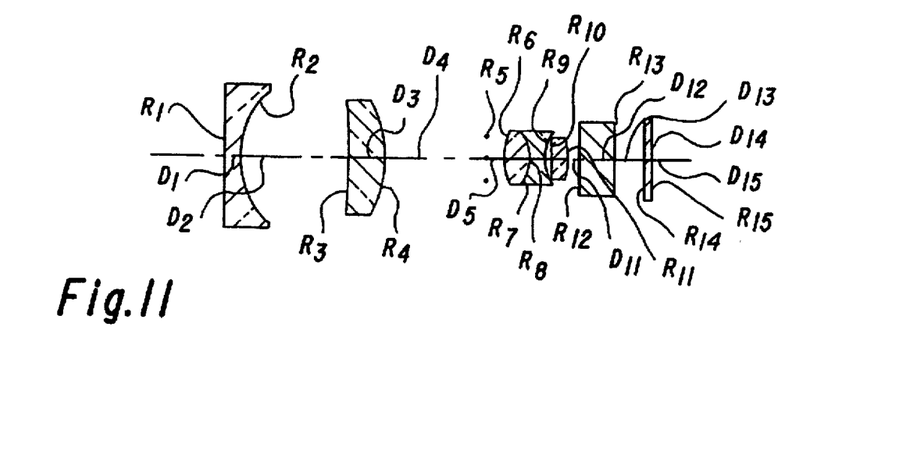
FIGS. 11 through 15 are a cross section and graphical illustrations of the aberrations of Example 3 of the invention.
Figure 12:
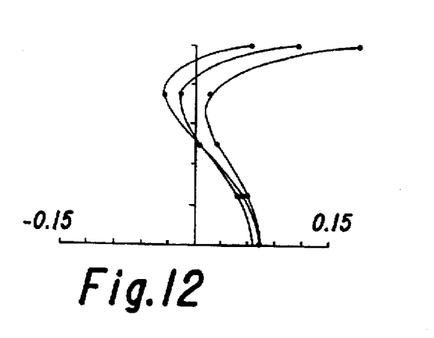
Figure 13:
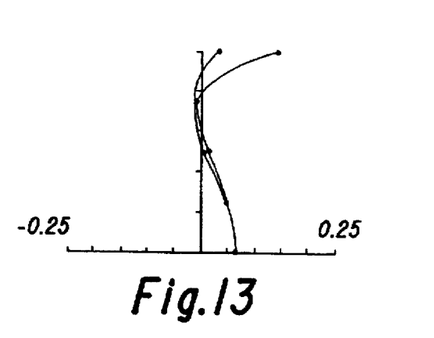
Figure 14:
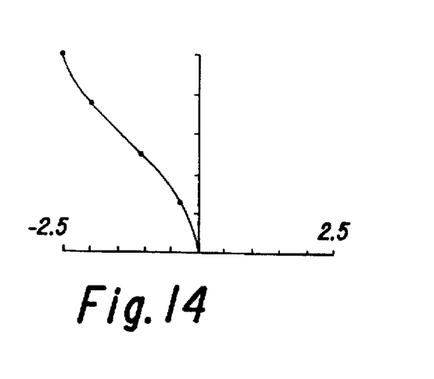
Figure 15:
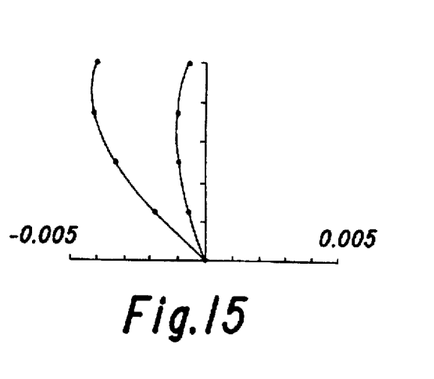

Table 3 gives numerical values for Example 3. FIG. 11 is a cross section of Example 3 and FIGS. 12–15 are graphical illustrations of the various aberrations of Example 3. In this example, vignetting is controlled on the rear surface of the fifth element. The clear aperture of this surface is restricted to 4.30 mm. The image plane illuminance at the maximum field angle is 45% of the axial illuminance when vignetting and $\cos^4$ fall-off are taken into account. The aberration plots presented in FIG. 3 are computed using the numerical values given in the table below. The values of D11, D13, and D15 can be adjusted without affecting the performance of the design, provided their sum is held constant. The lens can be focused by moving the three elements behind the stop; D5 and D11 are adjusted such that their sum is constant.

TABLE 3

| efl = 6.83 | F number = 2.84 | Full field = 64° | Back focal length = 8.15 |
|---|---|---|---|
| R1 = −329.68 | D1 = 1.50 | N1 = 1.71300 | V1 = 53.8 |
| R2 = 9.26 | D2 = 10.90 | | |
| R3 = −116.45 | D3 = 3.68 | N3 = 1.71300 | V3 = 53.8 |
| R4 = −14.00 | D4 = 10.24 | | |
| R5 = 0.00 | D5 = 1.75 | | |
| R6 = 5.03 | D6 = 2.60 | N6 = 1.69350 | V6 = 53.3 |
| R7 = −4.23 | D7 = 1.52 | N7 = 1.78179 | V7 = 37.1 |
| R8 = 4.23 | D8 = 0.60 | | |
| R9 = 16.98 | D9 = 1.86 | N9 = 1.51680 | V9 = 64.2 |
| R10 = −6.36 | D10 = 1.03 | | |
| R11 = 0.00 | D11 = 3.56 | N11 = 1.54430 | V11 = 70.2 |
| R12 = 0.00 | D12 = 3.00 | | |
| R13 = 0.00 | D13 = 0.76 | N13 = 1.53338 | V13 = 61.3 |
| R14 = 0.00 | D14 = 1.33 | | |

EXAMPLE 4

Example 4 of the invention is a reverse telephoto design having the form (−+ stop +−+), where the first element is meniscus with the convex side towards the object, the second element is meniscus with the concave side toward the object, the third element is biconvex, the fourth element is biconcave, and the fifth element is biconvex. The rear surface of the third element is aspheric for improved performance. The lens is corrected for use with a birefringent blur filter and an array photodetector cover glass located behind the lens. The ratio of the back focal length over the effective focal length is 1.48 and the ratio of the lens length over the effective focal length is 7.53. The f-number is f/2.84 and lens covers a total field angle of 59°. The focal length is 5.36 mm and the lens is suitable for use with an array photodetector having a semi-diagonal of 2.96 mm.

The lens satisfies the following conditions for the Abbe number of each element:

$$35 \leq V_1 \leq 55 \tag{19}$$

$$36 \leq V_2 \leq 45 \tag{20}$$

$$45 \leq V_3 \leq 52 \tag{21}$$

$$25 \leq V_4 \leq 35 \tag{22}$$

$$40 \leq V_5 \leq 65 \tag{23}$$

Maintaining Equation (19) helps correct astigmatism, lateral color, and distortion. An Abbe number of 55 is at the edge of the glass chart for the preferred index; a design using it for the first element can be adequately corrected. Maintaining Equation (20) helps correct distortion and lateral color. Maintaining Equation (21) helps correct astigmatism, distortion, and lateral color. An Abbe number of 52 is at the edge of the glass chart for the preferred index; a design using it for the third element can be adequately corrected. In Equation (22), an Abbe number of 25 is at the edge of the glass chart for this index; a design using it for the fourth element can be adequately corrected. If the Abbe number exceeds 35, too much lateral color is induced into Example 4. In Equation (23), if the Abbe number is less than 40, too much lateral color will be induced into Example 4. If it is allowed to exceed 65, the astigmatism in the resulting design are difficult to correct.

The design satisfies the following conditions on the ratio of the focal length of each element over the focal length of the design:

$$-1.98 \leq \frac{efl_1}{efl} \leq -2.14 \tag{24}$$

$$7.09 \leq \frac{efl_2}{efl} \leq 12.13 \tag{25}$$

$$1.03 \leq \frac{efl_3}{efl} \leq 1.50 \tag{26}$$

$$-1.09 \leq \frac{efl_4}{efl} \leq -0.63 \tag{27}$$

$$1.03 \leq \frac{efl_5}{efl} \leq 1.68 \tag{28}$$

Maintaining Equation (24) helps correct lateral color and field curvature. Maintaining Equation (25) helps correct lateral color and distortion. Maintaining Equation (26) helps correct distortion, coma and astigmatism. Maintaining Equation (27) helps correct distortion and astigmatism. Maintaining Equation (28) helps correct astigmatism.

The design satisfies the following conditions on the bending of each element:

$$-1.90 \leq X_1 \leq -0.75 \tag{29}$$

$$-23.8 \leq X_2 \leq -3.9 \tag{30}$$

$$-0.25 \leq X_3 \leq 0.54 \tag{31}$$

$$-0.40 \leq X_4 \leq 0.33 \tag{32}$$

$$-1.11 \leq X_5 \leq -0.27 \tag{33}$$

Maintaining Equation (29) helps correct lateral color, distortion and spherical aberration. (Note that bendings in Equation (29) for the range $-1.00 \leq X_1 \leq -0.75$ describe a negative biconcave front element rather than a negative meniscus front element. Example 5 utilizes a negative biconcave front element.) Maintaining Equation (30) helps correct lateral color, field curvature, and astigmatism. Maintaining Equation (31) helps correct distortion and astigmatism. Maintaining Equation (32) helps correct spherical aberration and astigmatism. Maintaining Equation (33) helps correct distortion, coma and astigmatism. (Note that bendings in Equation (33) for the range $-1.11 \leq X_5 \leq -1.00$ describe a fifth element that is meniscus with its concave side toward the object rather than biconvex. Example 6 uses a meniscus fifth element.)

The design satisfies the following conditions on the ratios of three of the air spaces over the focal length of the design:

$$0.79 \leq \frac{D_2}{efl} \leq 1.21 \tag{34}$$

$$2.05 \leq \frac{D_4}{efl} \tag{35}$$

$$0.00 \leq \frac{D_5}{efl} \leq 0.75 \tag{36}$$

$D_2$ is the air space between the first and second elements. Maintaining Equation (34) helps correct spherical aberration, distortion and astigmatism. $D_4$ is the air space between the second element and the stop. Maintaining Equation (35) helps correct spherical aberration, field curvature, and distortion. $D_5$ is the air space between the stop and the third element. Maintaining Equation (36) helps correct distortion and astigmatism.

The rear surface of the third element in Examples 4–7 is aspheric. The surface sag is described by:

$$X = \frac{CY^2}{1 + \sqrt{1 - (k+1)C^2 Y^2}}$$

The conic constant in the design satisfies the following condition:

$$-27.00 \leq k \leq 6.40 \tag{37}$$

Maintaining Equation (37) helps correct for spherical aberration, astigmatism and distortion. Note that the range includes k=0, in which case the surface is spherical.

Example 4 satisfies Equations (19) through (37).

Figure 16:
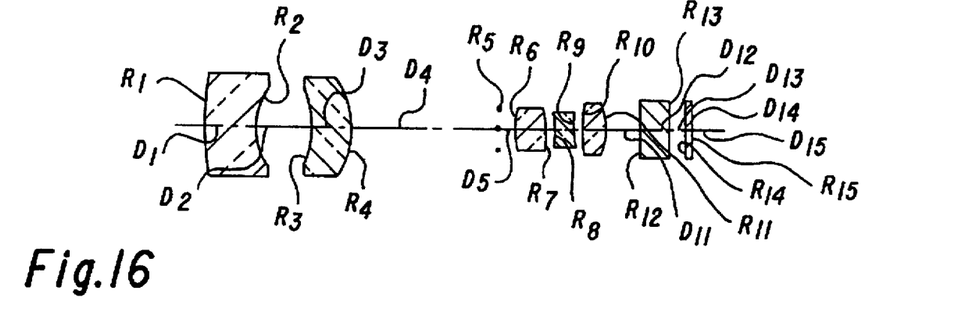
FIGS. 16 through 20 are a cross section and graphical illustrations of the aberrations of Example 4 of the invention.
Figure 17:
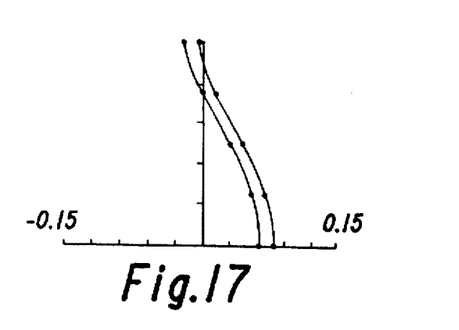
Figure 18:
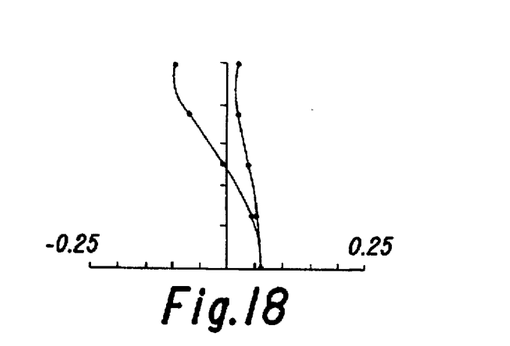
Figure 19:
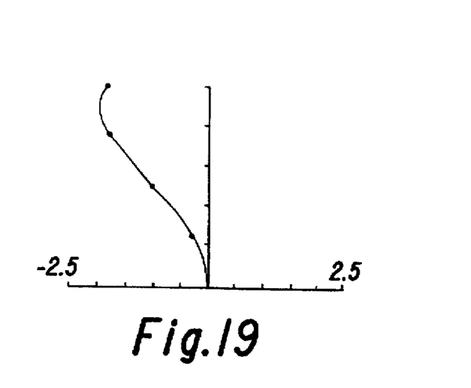
Figure 20:
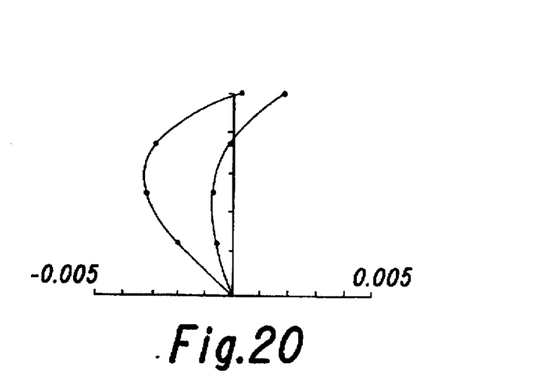

Table 4 gives numerical values for Example 4. FIG. 16 is a cross section of Example 4 and FIGS. 17 through 20 are graphical illustrations of the various aberrations of Example 4. In this example, vignetting is controlled on the rear surface of the second element, the rear surface of the third element, and the rear surface of the fifth element. The clear aperture of these surfaces are restricted to 9.96 mm, 3.76 mm, and 5.20 mm, respectively. The image plane illuminance at the maximum field angle is 45% of the axial illuminance when vignetting and $\cos^4$ fall-off are taken into account. The two plano-plano elements following the fifth lens element model the birefringent blur filter and array photodetector cover glass for the purposes of lens design. The aberration plots presented in FIG. 4 are computed using the numerical values given in the table below. The values of D11, D13, and D15 can be adjusted without affecting the performance of the design, provided their sum is held constant. The long back focal length of this design allows the array photodetector cover glass to be displaced a sufficient distance from the photosites to minimize the effect of cover glass imperfections on the image quality. The lens can be focused by moving the three elements behind the stop; D5 and D11 are adjusted such that their sum is constant. Elements 3, 4, and 5 are optimized for fabrication by glass molding.

TABLE 4

| efl = 5.36 | F number = 2.84 | Full field = 59° | Back focal length = 7.99 |
|---|---|---|---|
| R1 = 31.76 | D1 = 5.00 | N1 = 1.69100 | V1 = 54.7 |
| R2 = 6.61 | D2 = 5.65 | | |
| R3 = −10.96 | D3 = 4.00 | N3 = 1.62004 | V3 = 36.4 |
| R4 = −8.99 | D4 = 15.00 | | |
| R5 = 0.00 | D5 = 1.59 | | |
| R6 = 6.91 | D6 = 3.00 | N6 = 1.72800 | V6 = 50.6 |
| C7 = −0.087589 | D7 = 1.00 | | |
| k7 = −3.447987 | | | |
| R8 = −6.33 | D8 = 1.89 | N8 = 1.78200 | V8 = 26.0 |
| R9 = 6.33 | D9 = 0.84 | | |
| R10 = 24.51 | D10 = 2.35 | N10 = 1.79980 | V10 = 46.2 |
| R11 = −6.51 | D11 = 3.28 | | |
| R12 = 0.00 | D12 = 3.02 | N12 = 1.54430 | V12 = 70.2 |
| R13 = 0.00 | D13 = 1.50 | | |
| R14 = 0.00 | D14 = 0.76 | N14 = 1.53338 | V14 = 61.3 |
| R15 = 0.00 | D15 = 0.77 | | |

Decentering or tilting the aspheric surface in Example 4 has only a small effect on the performance of the design. This is an advantage because it allows relaxed manufacturing tolerances on fabricating, centering, and mounting the aspheric element. The table below shows the effect of 1 minute of tilt and 0.010 mm of decenter of the aspheric surface in Example 4 on the performance of the design. Performance is evaluated at 70% of maximum field.

| | Linear Fld Tilt | Angular Fld Tilt | RMS OPD | RMS Spot Dia |
|---|---|---|---|---|
| Nominal values for entire design | 0.00000 | 0.000 | 0.198966 | 0.006567 |

Changes in performance due to surface tilts/decenters

| Surface | Linear Fld. Tilt | Angular Fld. Tilt | RMS OPD | RMS Spot Dia |
|---|---|---|---|---|
| 7 TLA | −0.0018 | −1.024 | 0.000168 | 0.000011 |
| DCY | −0.00641 | −5.572 | 0.000754 | 0.000046 |

Linear & Angular field tilt are based on tangential field only.
Angular Field Tilt given in minutes of arc.
Tilt Values: TLA−0.016667 (=−1.00 minutes). Decenter Values: DCY 0.010000.

EXAMPLE 5

Example 5 of the invention is a reverse telephoto design having the form (−+ stop +−+), where the first element is biconcave, the second element is meniscus with the concave side toward the object, the third element is biconvex, the fourth element is biconcave, and the fifth element is biconvex. The rear surface of the third element is aspheric. The lens is corrected for use with a birefringent blur filter and an array photodetector cover glass located behind the lens. The ratio of the back focal length over the effective focal length is 1.51 and the ratio of the lens length over the effective focal length is 7.21. The f-number is f/2.84 and lens covers a total field angle of 59.5°. The focal length is 5.36 mm and the lens is suitable for use with an array photodetector having a semi-diagonal of 2.96 mm.

Example 5 satisfies Equations (19) through (37).

Figure 21:
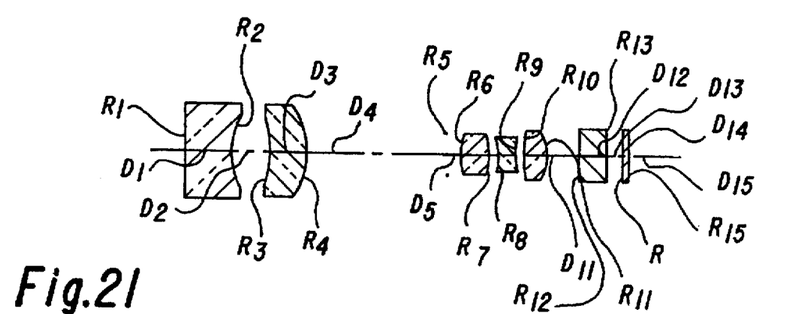
FIGS. 21 through 25 are a cross section and graphical illustrations of the aberrations of Example 5 of the invention.
Figure 22:
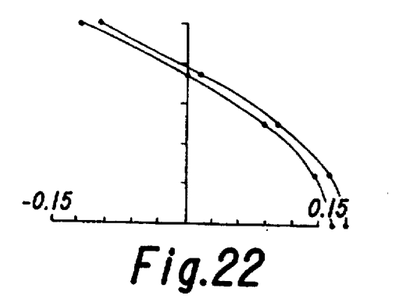
Figure 23:
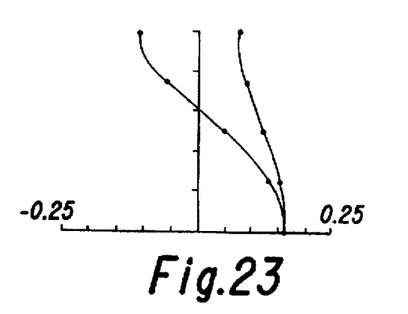
Figure 24:
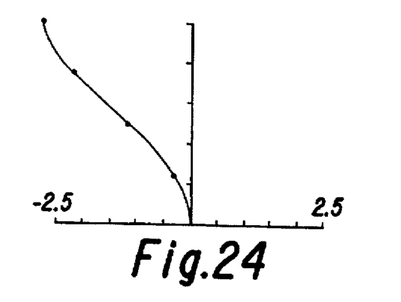
Figure 25:
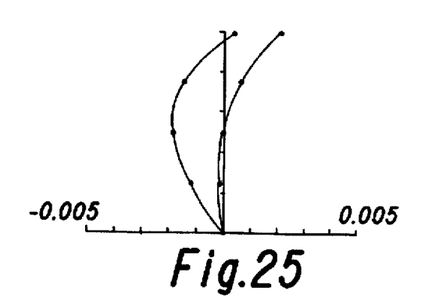

Table 5 gives numerical values for Example 5. FIG. 21 is a cross section of Example 5 and FIGS. 22 through 25 are graphical illustrations of the various aberrations of Example 5. In this example, vignetting is controlled on the rear surface of the second element, the rear surface of the third element, and the rear surface of the fifth element. The clear aperture of these surfaces are restricted to 9.96 mm, 3.76 mm, and 5.20 mm, respectively. The image plane illuminance at the maximum field angle is 45% of the axial illuminance when vignetting and $\cos^4$ fall-off are taken into account. The aberration plots presented in FIG. 5 are computed using the numerical values given in the table below. The values of D11, D13, and D15 can be adjusted without affecting the performance of the design, provided their sum is held constant. The long back focal length of this design allows the array photodetector cover glass to be displaced a sufficient distance from the photo sites to minimize the effect of cover glass imperfections on the image quality. The lens can be focused by moving the three elements behind the stop; D5 and D11 are adjusted such that their sum is constant. Elements 3, 4, and 5 are optimized for fabrication by glass molding.

TABLE 5

| efl = 5.36 | F number = 2.84 | Full field = 59.5° | Back focal length = 8.105 |
|---|---|---|---|
| R1 = −100.00 | D1 = 5.00 | N1 = 1.69100 | V1 = 54.7 |
| R2 = 8.17 | D2 = 3.99 | | |
| R3 = −15.71 | D3 = 4.00 | N3 = 1.62004 | V3 = 36.4 |
| R4 = −9.41 | D4 = 15.00 | | |
| R5 = 0.00 | D5 = 1.59 | | |
| R6 = 7.03 | D6 = 3.00 | N6 = 1.72800 | V6 = 50.6 |
| c7 = −0.093853 | D7 = 1.00 | | |
| k7 = −1.692032 | | | |
| R8 = −6.15 | D8 = 1.89 | N8 = 1.78206 | V8 = 26.0 |
| R9 = 6.15 | D9 = 0.84 | | |
| R10 = 27.13 | D10 = 2.35 | N10 = 1.79980 | V10 = 46.2 |
| R11 = −6.25 | D11 = 3.28 | | |
| R12 = 0.00 | D12 = 3.02 | N12 = 1.54430 | V12 = 70.2 |
| R13 = 0.00 | D13 = 1.50 | | |
| R14 = 0.00 | D14 = 0.76 | N14 = 1.53338 | V14 = 61.3 |
| R15 = 0.00 | D15 = 0.87 | | |

EXAMPLE 6

Example 6 of the invention is a reverse telephoto design having the form (−+ stop +−+), where the first element is meniscus with the convex side toward the object, the second element is meniscus with the concave side toward the object, the third element is biconvex, the fourth element is biconcave, and the fifth element is meniscus with the concave side toward the object. The rear surface of the third element is aspheric. The lens is corrected for use with a birefringent blur filter and an array photodetector cover glass located behind the lens. The ratio of the back focal length over the effective focal length is 1.49 and the ratio of the lens length over the effective focal length is 7.51. The f-number is f/2.84 and the lens covers a total field angle of 58.6°. The focal length is 5.37 mm and the lens is suitable for use with an array photodetector having a semi-diagonal of 2.96 mm.

Example 6 satisfies Equations (19) through (37).

Figure 26:
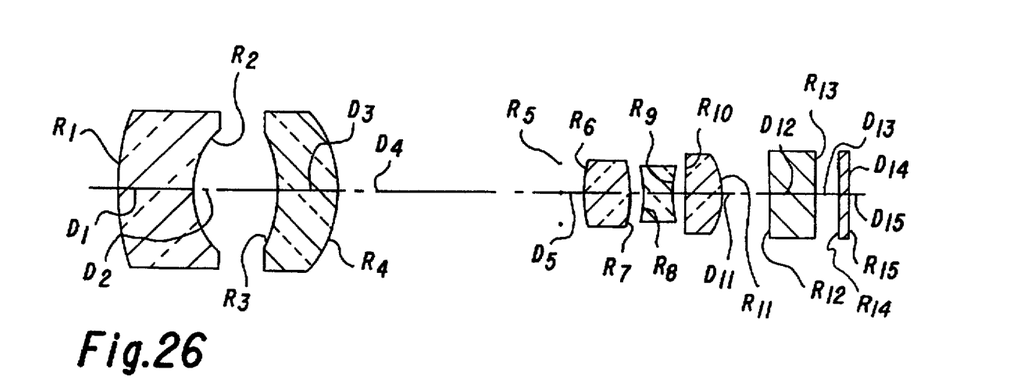
FIGS. 26 through 30 are a cross section and graphical illustrations of the aberrations of Example 6 of the invention.
Figure 27:
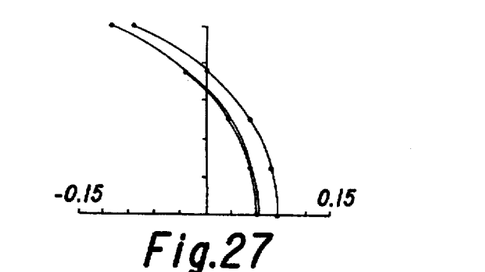
Figure 28:
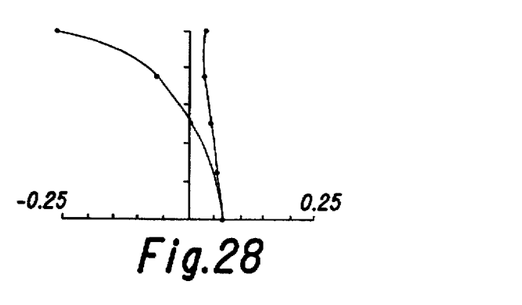
Figure 29:
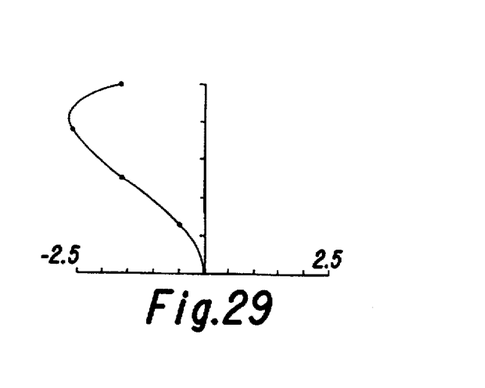
Figure 30:
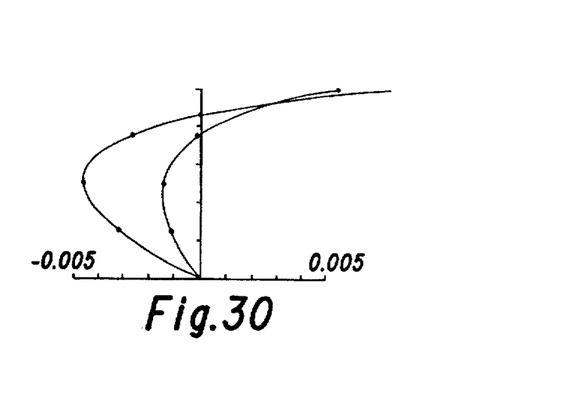

Table 6 gives numerical values for Example 6. FIG. 26 is a cross section of Example 6 and FIGS. 29 through 30 are graphical illustrations of the various aberrations of Example 4. In this example, vignetting is controlled on the rear surface of the second element, the rear surface of the third element, and the rear surface of the fifth element. The clear aperture of these surfaces are restricted to 10.66 mm, 3.55 mm, and 5.34 mm, respectively. The image plane illuminance at the maximum field angle is 45% of the axial illuminance when vignetting and $\cos^4$ fall-off are taken into account. The aberration plots presented in FIG. 6 are computed using the numerical values given in the table below. The values of D11, D13, and D15 can be adjusted without affecting the performance of the design, provided their sum is held constant. The long back focal length of this design allows the array photodetector cover glass to be displaced a sufficient distance from the photosites to minimize the effect of cover glass imperfections on the image quality. The lens can be focused by moving the three elements behind the stop; D5 and D11 are adjusted such that their sum is constant. Elements 3, 4, and 5 are optimized for fabrication by glass molding.

TABLE 6

| efl = 5.37 | F number = 2.84 | Full field = 58.6° | Back focal length = 8.01 |
|---|---|---|---|
| R1 = 16.05 | D1 = 5.00 | N1 = 1.69100 | V1 = 54.7 |
| R2 = 5.80 | D2 = 5.65 | | |
| R3 = -8.20 | D3 = 4.00 | N3 = 1.62004 | V3 = 36.4 |
| R4 = -8.09 | D4 = 15.00 | | |
| R5 = 0.00 | D5 = 1.59 | | |
| R6 = 8.09 | D6 = 3.00 | N6 = 1.72800 | V6 = 50.6 |
| c7 = -0.106097 | D7 = 1.00 | | |
| k7 = -6.680424 | | | |
| R8 = 6.82 | D8 = 1.89 | N8 = 1.78200 | V8 = 26.0 |
| R9 = 6.82 | D9 = 0.84 | | |
| R10 = -96.45 | D10 = 2.35 | N10 = 1.79980 | V10 = 46.2 |
| R11 = -5.10 | D11 = 3.28 | | |
| R12 = 0.00 | D12 = 3.02 | N12 = 1.54430 | V12 = 70.2 |
| R13 = 0.00 | D13 = 1.50 | | |
| R14 = 0.00 | D14 = 0.76 | N14 = 1.53338 | V14 = 61.3 |
| R15 = 0.00 | D15 = 0.78 | | |

EXAMPLE 7

Example 7 of the invention is a reverse telephoto design having the form (−+ stop +−+), where the first element is meniscus with the convex side toward the object, the second element is meniscus with the concave side toward the object, the third element is biconvex, the fourth element is biconcave, and the fifth element is biconvex. The rear surface of the third element is aspheric. The lens is corrected for use with a birefringent blur filter and an array photodetector cover glass located behind the lens. The ratio of the back focal length over the effective focal length is 1.16 and the ratio of the lens length over the effective focal length is 5.77. The f-number is f/2.84 and the lens covers a total field angle of 58.8°. The focal length is 5.40 mm and the lens is suitable for use with an array photodetector having a semi-diagonal of 2.96 mm.

Figure 31:
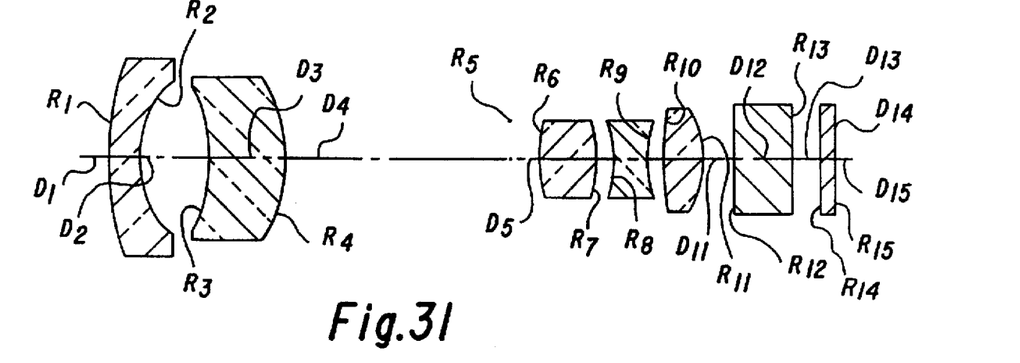
FIGS. 31 through 35 are a cross section and graphical illustrations of the aberrations of Example 7 of the invention.
Figure 32:
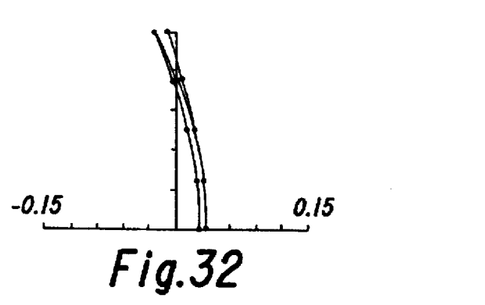
Figure 33:
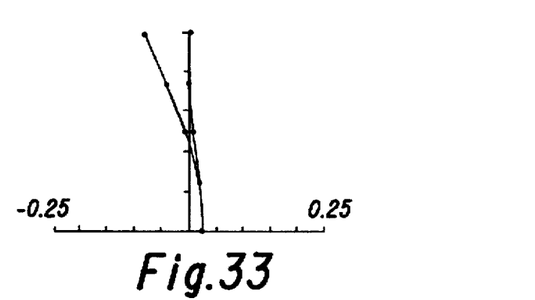
Figure 34:
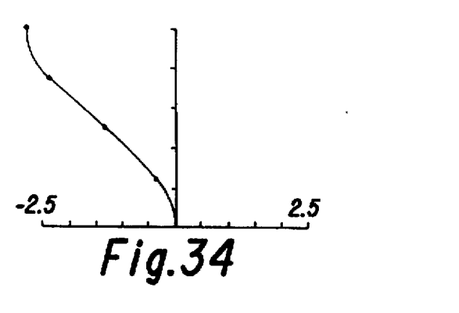
Figure 35:
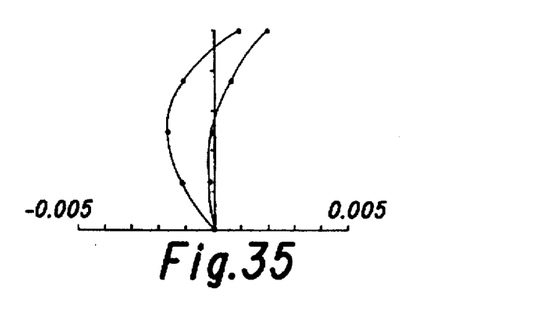

Table 7 gives numerical values for Example 7. FIG. 31 is a cross section of Example 7 and FIGS. 32 through 35 are graphical illustrations of the various aberrations of Example 7. In this example, vignetting is controlled on the rear surface of the second element, the front surface of the third element, and the rear surface of the fifth element. The clear aperture of these surfaces are restricted to 8.64 mm, 4.04 mm, and 5.40 mm, respectively. The image plane illuminance at the maximum field angle is 49% of the axial illuminance when vignetting and $\cos^4$ fall-off are taken into account. The two plano-plano elements following the fifth lens element model the birefringent blur filter and array photodetector cover glass for the purposes of lens design. The aberration plots presented in FIG. 7 are computed using the numerical values given in the table below. The values of D11, D13, and D15 can be adjusted without affecting the performance of the design, provided their sum is held constant. The lens can be focused by moving the three elements behind the stop; D5 and D11 are adjusted such that their sum is constant.

| efl = 5.40 | F number = 2.84 | Full field = 58.8° | Back focal length = 6.29 |
|---|---|---|---|
| R1 = 18.73 | D1 = 1.50 | N1 = 1.51680 | V1 = 64.2 |
| R2 = 5.29 | D2 = 3.72 | | |
| R3 = -8.77 | D3 = 4.00 | N3 = 1.69680 | V3 = 55.5 |
| R4 = -8.50 | D4 = 11.85 | | |
| R5 = 0.00 | D5 = 1.55 | | |
| R6 = 6.25 | D6 = 3.00 | N6 = 1.72800 | V6 = 50.6 |
| c7 = -0.107813 | D7 = 1.00 | | |
| k7 = -5.385944 | | | |
| R8 = -5.94 | D8 = 1.76 | N8 = 1.80518 | V8 = 25.4 |
| R9 = 5.94 | D9 = 0.85 | | |
| R10 = 19.70 | D10 = 1.93 | N10 = 1.77250 | V10 = 49.6 |
| R11 = -6.20 | D11 = 1.61 | | |
| R12 = 0.00 | D12 = 3.02 | N12 = 1.54430 | V12 = 70.2 |
| R13 = 0.00 | D13 = 1.50 | | |
| R14 = 0.00 | D14 = 0.76 | N14 = 1.53338 | V14 = 61.3 |
| R15 = 0.00 | D15 = 0.74 | | |

EXAMPLE 8

Example 8 of the invention is a reverse telephoto design having the form (−+ stop +−+), where the first element is meniscus with the convex side toward the object, the second element is meniscus with the concave side toward the object, the third element is biconvex, the fourth element is biconcave, and the fifth element is biconvex. The lens is corrected for use with a birefringent blur filter and an array photodetector cover glass located behind the lens. The ratio of the back focal length over the effective focal length is 1.16 and the ratio of the lens length over the effective focal length is 4.86. The f-number is f/2.84 and the lens covers a total field angle of 60°. The focal length is 5.40 mm and the lens is suitable for use with an array photodetector having a semi-diagonal of 2.96 mm.

Figure 36:
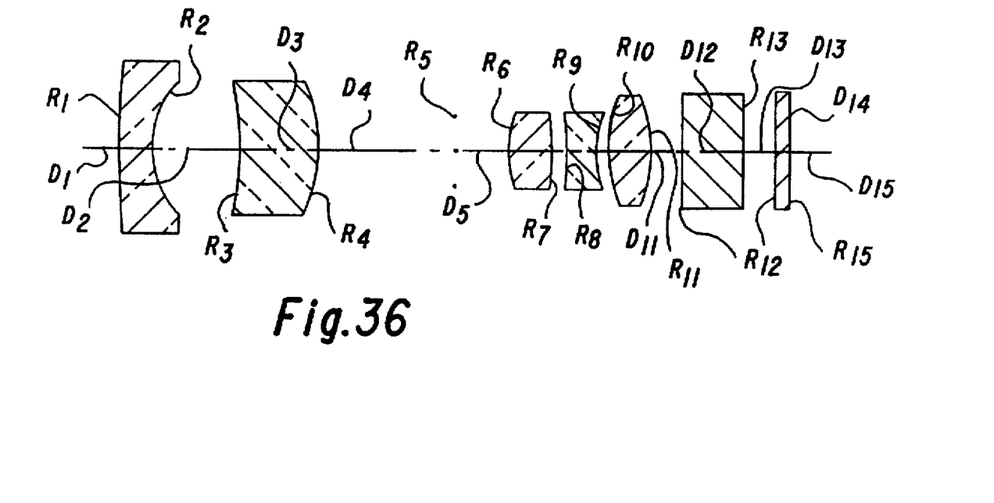
FIGS. 36 through 40 are a cross section and graphical illustrations of the aberrations of Example 8 of the invention.
Figure 37:
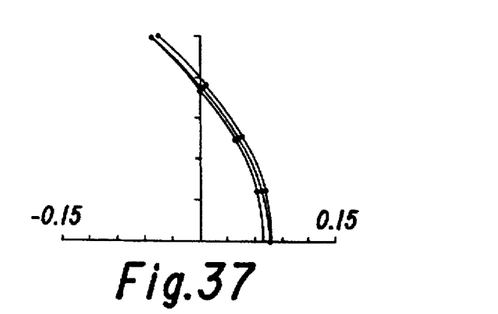
Figure 38:
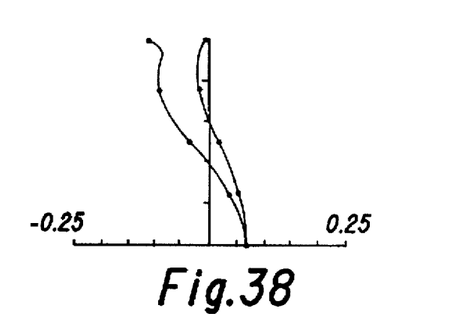
Figure 39:
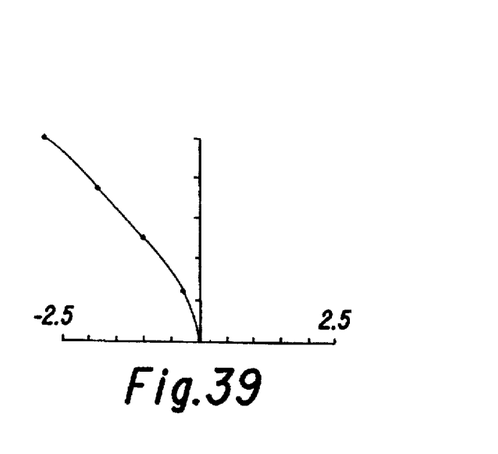
Figure 40:
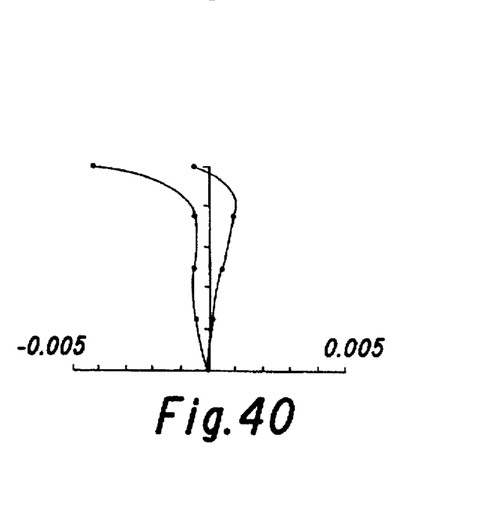

Table 8 gives numerical values for Example 8. FIG. 36 is a cross section of Example 7 and FIGS. 37 through 40 are graphical illustrations of the various aberrations of Example 8. In this example, vignetting is controlled on the rear surface of the second element, the rear surface of the third element, and the rear surface of the fourth element. The clear aperture of these surfaces are restricted to 6.70 mm, 3.62 mm, and 3.96 mm, respectively. The image plane illuminance at the maximum field angle is 46% of the axial illuminance when vignetting and $\cos^4$ fall-off are taken into account. The two plano-plano elements following the fifth lens element model the birefringent blur filter and array photodetector cover glass for the purposes of lens design. The aberration plots presented in FIG. 8 are computed using the numerical values given in the table below. The values of D11, D13, and D15 can be adjusted without affecting the performance of the design, provided their sum is held constant. The lens can be focused by moving the three elements behind the stop; D5 and D11 are adjusted such that their sum is constant.

TABLE 8

| efl = 5.40 F number = 2.84 Full field = 60° Back focal length = 6.28 | | | |
|---|---|---|---|
| R1 = 91.28 | D1 = 1.50 | N1 = 1.56384 | V1 = 60.8 |
| R2 = 4.70 | D2 = 4.20 | | |
| R3 = −22.94 | D3 = 4.00 | N3 = 1.69680 | V3 = 55.5 |
| R4 = −7.68 | D4 = 6.77 | | |
| R5 = 0.00 | D5 = 2.72 | | |
| R6 = 6.62 | D6 = 2.05 | N6 = 1.69680 | V6 = 55.5 |
| R7 = −35.09 | D7 = 0.75 | | |
| R8 = −20.53 | D8 = 1.50 | N8 = 1.80518 | V8 = 25.4 |
| R9 = 4.41 | D9 = 0.74 | | |
| R10 = 7.92 | D10 = 2.00 | N10 = 1.77250 | V10 = 49.6 |
| R11 = −7.92 | D11 = 1.56 | | |
| R12 = 0.00 | D12 = 3.02 | N12 = 1.54430 | V12 = 70.2 |
| R13 = 0.00 | D13 = 1.50 | | |
| R14 = 0.00 | D14 = 0.76 | N14 = 1.53338 | V14 = 61.3 |
| R15 = 0.00 | D15 = 0.78 | | |

I claim:

1. A reverse telephoto lens comprising, in order from a front, object side of the lens to a rear, image side of the lens:
   a front negative group of lens components including a front negative component and a rear positive component, separated by a first airspace A1;
   a rear positive group of lens elements separated from the front negative group by a second airspace A2; said rear positive group of lens elements including at least two positive lens elements and a negative lens element located therebetween and
   a stop located in the second airspace,
   wherein the distance between the front negative component and the rear positive group is at least 2.5 times the focal length of the lens, and wherein A1≦A2.

2. A reverse telephoto lens according to claim 1 wherein said distance is at least four times the focal length of the lens.

3. A reverse telephoto lens according to claim 1 wherein said distance is between four and five times the focal length of the lens.

4. A reverse telephoto lens according to claim 1 wherein the first airspace is between one and two times the focal length of the lens and is biconvex.

5. A reverse telephoto lens according to claim 1 wherein the second airspace is between 1.5 and three times the focal length of the lens.

6. A reverse telephoto lens according to claim 1 wherein the rear positive component is meniscus concave to the object.

7. A reverse telephoto lens according to claim 1 wherein the front negative component and the rear positive component are single elements and the first airspace is biconvex.

8. A lens according to claim 1, having the following numerical values:

| efl = 6.83 F number = 2.84 Full field = 64° Back focal length = 8.15 object distance = 2400 mm | | | |
|---|---|---|---|
| R1 = −329.68 | D1 = 1.50 | N1 = 1.71300 | V1 = 53.8 |
| R2 = 9.26 | D2 = 10.90 | | |
| R3 = −116.45 | D3 = 3.68 | N3 = 1.71300 | V3 = 53.8 |
| R4 = −14.00 | D4 = 10.24 | | |
| R5 = 0.00 | D5 = 1.75 | | |
| R6 = 5.03 | D6 = 2.60 | N6 = 1.69350 | V6 = 53.3 |

-continued

| efl = 6.83 F number = 2.84 Full field = 64° Back focal length = 8.15 object distance = 2400 mm | | | |
|---|---|---|---|
| R7 = −4.23 | D7 = 1.52 | N7 = 1.78179 | V7 = 37.1 |
| R8 = 4.23 | D8 = 0.60 | | |
| R9 = 16.98 | D9 = 1.86 | N9 = 1.51680 | V9 = 64.2 |
| R10 = −6.36 | D10 = 1.03 | | |
| R11 = 0.00 | D11 = 3.56 | N11 = 1.54430 | V11 = 70.2 |
| R12 = 0.00 | D12 = 3.00 | | |
| R13 = 0.00 | D13 = 0.76 | N13 = 1.53338 | V13 = 61.3 |
| R14 = 0.00 | D14 = 1.33 | | | said lens being followed by a birefringent blur filter and array photodetector cover glass, as indicated by $R_{11}-R_{14}$ in the table, and being focusable by adjusting D5 and D11 such that their sum is constant.

9. A reverse telephoto lens comprising, in order from the object side, a negative meniscus element with a convex side toward the object, a positive meniscus element with a concave side toward the object, the aperture stop, a positive biconvex element, a negative biconcave element, and a positive biconvex element, said lens system satisfying the following conditions:

$$45 \leq V_1 \leq 55 \quad (1)$$

$$30 \leq V_2 \leq 55 \quad (2)$$

$$44 \leq V_3 \leq 55 \quad (3)$$

$$28 \leq V_4 \leq 33 \quad (4)$$

$$39 \leq V_5 \leq 65 \quad (5)$$

$$-3.20 \leq \frac{efl_1}{efl} \leq -2.41 \quad (6)$$

$$4.97 \leq \frac{efl_2}{efl} \leq 9.80 \quad (7)$$

$$0.79 \leq \frac{efl_3}{efl} \leq 1.23 \quad (8)$$

$$-0.82 \leq \frac{efl_4}{efl} \leq -0.53 \quad (9)$$

$$1.00 \leq \frac{efl_5}{efl} \leq 1.50 \quad (10)$$

$$-3.05 \leq X_1 \leq -2.17 \quad (11)$$

$$-11.3 \leq X_2 \leq -4.3 \quad (12)$$

$$0.22 \leq X_3 \leq 0.74 \quad (13)$$

$$-0.40 \leq X_4 \leq 0.19 \quad (14)$$

$$-0.75 \leq X_5 \leq 0.00 \quad (15)$$

$$1.00 \leq \frac{d_2}{efl} \leq 2.00 \quad (16)$$

$$1.46 \leq \frac{d_4}{efl} \leq 2.37 \quad (17)$$

$$0.12 \leq \frac{d_5}{efl} \leq 0.41 \quad (18)$$

where
$V_i$ is the Abbe number of element i,
$efl_i$ is the focal length of element i,
efl is the focal length of the lens,
$X_i$ is the bending of element i,
$d_2$ is the air space between the first and second element,
$d_4$ is the air space between the second element and the aperture stop, $d_5$ is the air space between the aperture stop and the third element, and distances are in millimeters.

10. A lens according to claim 9 having the following numerical values, efl = 6.84  F number = 2.84  Full field = 64°  Back focal length = 8.15
object distance = 2400 mm

| | | | |
|---|---|---|---|
| R1 = 13.43 | D1 = 1.75 | N1 = 1.77250 | V1 = 49.6 |
| R2 = 6.49 | D2 = 7.23 | | |
| R3 = −12.19 | D3 = 3.68 | N3 = 1.58215 | V3 = 42.1 |
| R4 = −9.51 | D4 = 10.06 | | |
| R5 = 0.00 | D5 = 1.75 | | |
| R6 = 6.42 | D6 = 2.60 | N6 = 1.77250 | V6 = 49.6 |
| R7 = −10.05 | D7 = 0.60 | | |
| R8 = −5.89 | D8 = 1.50 | N8 = 1.72825 | V8 = 28.4 |
| R9 = 5.89 | D9 = 0.70 | | |
| R10 = 30.92 | D10 = 1.86 | N10 = 1.65113 | V10 = 55.9 |
| R11 = −6.56 | D11 = 1.05 | | |
| R12 = 0.00 | D12 = 3.56 | N12 = 1.54430 | V12 = 70.2 |
| R13 = 0.00 | D13 = 3.00 | | |
| R14 = 0.00 | D14 = 0.76 | N14 = 1.53338 | V14 = 61.3 |
| R15 = 0.00 | D15 = 1.32 | | | said lens being followed by a birefringent blur filter and array photodetector cover glass, as indicated by $R_{12}$-$R_{15}$ in the table, and being focusable by adjusting D5 and D11 such that their sum is constant.

11. A lens according to claim 9, having the following numerical values:

efl = 6.83  F number = 2.84  Full field = 64°  Back focal length = 8.15
object distance = 2400 mm

| | | | |
|---|---|---|---|
| R1 = 15.54 | D1 = 1.50 | N1 = 1.72800 | V1 = 50.6 |
| R2 = 6.83 | D2 = 10.29 | | |
| R3 = −13.56 | D3 = 3.68 | N3 = 1.72800 | V3 = 50.6 |
| R4 = −10.18 | D4 = 11.09 | | |
| R5 = 0.00 | D5 = 1.74 | | |
| R6 = 5.75 | D6 = 2.60 | N6 = 1.72800 | V6 = 50.6 |
| R7 = −19.53 | D7 = 0.57 | | |
| R8 = −8.50 | D8 = 1.50 | N8 = 1.72595 | V8 = 28.3 |
| R9 = 5.02 | D9 = 0.60 | | |
| R10 = 16.14 | D10 = 1.86 | N10 = 1.64673 | V10 = 55.5 |
| R11 = −7.60 | D11 = 1.05 | | |
| R12 = 0.00 | D12 = 3.56 | N12 = 1.54430 | V12 = 70.2 |
| R13 = 0.00 | D13 = 3.00 | | |
| R14 = 0.00 | D14 = 0.76 | N14 = 1.53338 | V14 = 61.3 |
| R15 = 0.00 | D15 = 1.32 | | | said lens being followed by a birefringent blur filter and array photodetector cover glass, as indicated by $R_{12}$-$R_{15}$ in the table, and being focusable by adjusting D5 and D11 such that their sum is constant.

12. A reverse telephoto lens comprising, in order from the object side, a negative meniscus element with convex side toward the object, a positive meniscus element with concave side toward the object, the aperture stop, a cemented doublet comprising a positive biconvex element and a negative biconcave element, and a positive biconvex element, said lens system satisfying the following conditions:

$$45 \leq V_1 \leq 55 \quad (1)$$

$$30 \leq V_2 \leq 55 \quad (2)$$

$$44 \leq V_3 \leq 55 \quad (3)$$

$$28 \leq V_4 \leq 33 \quad (4)$$

$$39 \leq V_5 \leq 65 \quad (5)$$

where $V_i$ is the Abbe number of element i.

13. A reverse telephoto lens comprising, in order from the object side, a negative element, a positive meniscus element with concave side toward the object, an aperture stop, a positive biconvex element having an aspheric rear surface with a sag $$X = \frac{CY^2}{1 + \sqrt{1 - (k+1)C^2Y^2}},$$

a negative biconcave element, and a positive element, where Y is the radius of the aspheric surface, k is the conic constant, and C is the curvature, and said lens system satisfying the following conditions:

$$35 \leq V_1 \leq 55 \quad (19)$$

$$36 \leq V_2 \leq 45 \quad (20)$$

$$45 \leq V_3 \leq 52 \quad (21)$$

$$25 \leq V_4 \leq 35 \quad (22)$$

$$40 \leq V_5 \leq 65 \quad (23)$$

$$-1.98 \leq \frac{efl_1}{efl} \leq -2.14 \quad (24)$$

$$7.09 \leq \frac{efl_2}{efl} \leq 12.13 \quad (25)$$

$$1.03 \leq \frac{efl_3}{efl} \leq 1.50 \quad (26)$$

$$-1.09 \leq \frac{efl_4}{efl} \leq -0.63 \quad (27)$$

$$1.03 \leq \frac{efl_5}{efl} \leq 1.68 \quad (28)$$

$$-1.90 \leq X_1 \leq -0.75 \quad (29)$$

$$-23.8 \leq X_2 \leq -3.9 \quad (30)$$

$$-0.25 \leq X_3 \leq 0.54 \quad (31)$$

$$-0.40 \leq X_4 \leq 0.33 \quad (32)$$

$$-1.11 \leq X_5 \leq -0.27 \quad (33)$$

$$0.79 \leq \frac{d_2}{efl} \leq 1.21 \quad (34)$$

$$2.05 \leq \frac{d_4}{efl} \quad (35)$$

$$0.00 \leq \frac{d_5}{efl} \leq 0.75 \quad (36)$$

$$-27.00 \leq k \leq 6.40 \quad (37)$$

where $V_i$ is the Abbe number of element i, $efl_i$ is the focal length of element i, efl is the focal length of the lens, $X_i$ is the bending of element i, $d_2$ is the air space between the first and second element, $d_4$ is the air space between the second element and the aperture stop, $d_5$ is the air space between the aperture stop and the third element, k is the conic constant of the rear surface of the third element and all distances are in millimeters.

14. A lens according to claim 13 where the first element is negative meniscus with convex side toward the object and the fifth element is positive biconvex.

15. A lens according to claim 14 having the following numerical values:

| efl = 5.36 F number 2.84 Full field = 59° Back focal length = 7.99 object distance = 2400 mm |||||
|---|---|---|---|
| R1 = 31.76 | D1 = 5.00 | N1 = 1.69100 | V1 = 54.7 |
| R2 = 6.61 | D2 = 5.65 | | |
| R3 = -10.96 | D3 = 4.00 | N3 = 1.62004 | V3 = 36.4 |
| R4 = -8.99 | D4 = 15.00 | | |
| R5 = 0.00 | D5 = 1.59 | | |
| R6 = 6.91 | D6 = 3.00 | N6 = 1.72800 | V6 = 50.6 |
| C7 = -0.087589 | D7 = 1.00 | | |
| k7 = -3.447987 | | | |
| R8 = -6.33 | D8 = 1.89 | N8 = 1.78200 | V8 = 26.0 |
| R9 = 6.33 | D9 = 0.84 | | |
| R10 = 24.51 | D10 = 2.35 | N10 = 1.79980 | V10 = 46.2 |
| R11 = 6.51 | D11 = 3.28 | | |
| R12 = 0.00 | D12 = 3.02 | N12 = 1.54430 | V12 = 70.2 |
| R13 = 0.00 | D13 = 1.50 | | |
| R14 = 0.00 | D14 = 0.76 | N14 = 1.53338 | V14 = 61.3 |
| R15 = 0.00 | D15 = 0.77 | | | said lens being followed by a birefringent blur filter and array photodetector cover glass, as indicated by $R_{12}$–$R_{15}$ in the table, and being focusable by adjusting D5 and D11 such that their sum is constant.

16. A lens according to claim 13 where the first element is negative biconcave and the fifth element is positive biconvex.

17. A lens according to claim 16 having the following numerical values:

| efl = 5.36 F number = 2.84 Full field = 59.5° Back focal length = 8.10 object distance = 2400 mm |||||
|---|---|---|---|
| R1 = -100.00 | D1 = 5.00 | N1 = 1.69100 | V1 = 54.7 |
| R2 = 8.17 | D2 = 3.99 | | |
| R3 = -15.71 | D3 = 4.00 | N3 = 1.62004 | V3 = 36.4 |
| R4 = -9.41 | D4 = 15.00 | | |
| R5 = 0.00 | D5 = 1.59 | | |
| R6 = 7.03 | D6 = 3.00 | N6 = 1.72800 | V6 = 50.6 |
| c7 = -0.093853 | D7 = 1.00 | | |
| k7 = -1.692032 | | | |
| R8 = -6.15 | D8 = 1.89 | N8 = 1.78200 | V8 = 26.0 |
| R9 = 6.15 | D9 = 0.84 | | |
| R10 = 27.13 | D10 = 2.35 | N10 = 1.79980 | V10 = 46.2 |
| R11 = -6.25 | D11 = 3.28 | | |
| R12 = 0.00 | D12 = 3.02 | N12 = 1.54430 | V12 = 70.2 |
| R13 = 0.00 | D13 = 1.50 | | |
| R14 = 0.00 | D14 = 0.76 | N14 = 1.53338 | V14 = 61.3 |
| R15 = 0.00 | D15 = 0.87 | | | said lens being followed by a birefringent blur filter and array photodetector cover glass, as indicated by $R_{12}$–$R_{15}$ in the table, and being focusable by adjusting D5 and D11 such that their sum is constant.

18. A lens according to claim 13 where the first element is negative meniscus with convex side toward the object and the fifth element is positive meniscus with concave side toward the object.

19. A lens according to claim 18 having the following numerical values:

| efl = 5.37 F number = 2.84 Full field = 58.6° Back focal length = 8.01 object distance = 2400 mm |||||
|---|---|---|---|
| R1 = 16.05 | D1 = 5.00 | N1 = 1.69100 | V1 = 54.7 |
| R2 = 5.80 | D2 = 5.65 | | |
| R3 = -8.20 | D3 = 4.00 | N3 = 1.62004 | V3 = 36.4 |
| R4 = -8.09 | D4 = 15.00 | | |
| R5 = 0.00 | D5 = 1.59 | | |
| R6 = 8.09 | D6 = 3.00 | N6 = 1.72800 | V6 = 50.6 |
| c7 = -0.106097 | D7 = 1.00 | | |
| k7 = -6.680424 | | | |
| R8 = -6.82 | D8 = 1.89 | N8 = 1.78200 | V8 = 26.0 |
| R9 = 6.82 | D9 = 0.84 | | |
| R10 = -96.45 | D10 = 2.35 | N10 = 1.79980 | V10 = 46.2 |
| R11 = -5.10 | D11 = 3.28 | | |
| R12 = 0.00 | D12 = 3.02 | N12 = 1.54430 | V12 = 70.2 |
| R13 = 0.00 | D13 = 1.50 | | |
| R14 = 0.00 | D14 = 0.76 | N14 = 1.53338 | V14 = 61.3 |
| R15 = 0.00 | D15 = 0.78 | | | said lens being followed by a birefringent blur filter and array photodetector cover glass, as indicated by $R_{12}$–$R_{15}$ in the table, and being focusable by adjusting D5 and D11 such that their sum is constant.

20. A reverse telephoto lens comprising, in order from the object side, a negative meniscus element with convex side towards the object, a positive meniscus element with concave side toward the stop, the aperture stop, a positive biconvex element having an aspheric rear surface with a sag $$X = \frac{CY^2}{1 + \sqrt{1 - (k+1)C^2 Y^2}},$$

a negative biconcave element, and a positive biconvex element, where Y is the radius, k is the conic constant, and C is the curvature of the aspheric surface, and the lens having the following numerical values:

| efl = 5.40 F number = 2.84 Full field = 58.8° Back focal length = 6.29 object distance = 2400 mm |||||
|---|---|---|---|
| R1 = 18.73 | D1 = 1.50 | N1 = 1.51680 | V1 = 64.2 |
| R2 = 5.29 | D2 = 3.72 | | |
| R3 = -8.77 | D3 = 4.00 | N3 = 1.69680 | V3 = 55.5 |
| R4 = -8.50 | D4 = 11.85 | | |
| R5 = 0.00 | D5 = 1.55 | | |
| R6 = 6.25 | D6 = 3.00 | N6 = 1.72800 | V6 = 50.6 |
| c7 = -0.107813 | D7 = 1.00 | | |
| k7 = -5.385944 | | | |
| R8 = -5.94 | D8 = 1.76 | N8 = 1.80518 | V8 = 25.4 |
| R9 = 5.94 | D9 = 0.85 | | |
| R10 = 19.70 | D10 = 1.93 | N10 = 1.77250 | V10 = 49.6 |
| R11 = -6.20 | D11 = 1.61 | | |
| R12 = 0.00 | D12 = 3.02 | N12 = 1.54430 | V12 = 70.2 |
| R13 = 0.00 | D13 = 1.50 | | |
| R14 = 0.00 | D14 = 0.76 | N14 = 1.53338 | V14 = 61.3 |
| R15 = 0.00 | D15 = 0.74 | | | said lens being followed by a birefringent blur filter and array photodetector cover glass, as indicated by $R_{12}$–$R_{15}$ in the table, and being focusable by adjusting D5 and D11 such that their sum is constant.

21. A reverse telephoto lens comprising, in order from the object side, a negative meniscus element with convex side towards the object, a positive meniscus element with concave side toward the stop, the aperture stop, a positive biconvex element, a negative biconcave element, and a positive biconvex element, the lens having the following numerical values:

| efl = 5.40 F number = 2.84 Full field = 60° Back focal length = 6.28 object distance = 2400 mm |||||
|---|---|---|---|
| R1 = 91.28 | D1 = 1.50 | N1 = 1.56384 | V1 = 60.8 |
| R2 = 4.70 | D2 = 4.20 | | | efl = 5.40  F number = 2.84  Full field = 60°  Back focal length = 6.28
object distance = 2400 mm

| | | | |
|---|---|---|---|
| R3 = −22.94 | D3 = 4.00 | N3 = 1.69680 | V3 = 55.5 |
| R4 = −7.68 | D4 = 6.77 | | |
| R5 = 0.00 | D5 = 2.72 | | |
| R6 = 6.62 | D6 = 2.05 | N6 = 1.69680 | V6 = 55.5 |
| R7 = −35.09 | D7 = 0.75 | | |
| R8 = −20.53 | D8 = 1.50 | N8 = 1.80518 | V8 = 25.4 |
| R9 = 4.41 | D9 = 0.74 | | |
| R10 = 7.92 | D10 = 2.00 | N10 = 1.77250 | V10 = 49.6 |
| R11 = −7.92 | D11 = 1.56 | | |
| R12 = 0.00 | D12 = 3.02 | N12 = 1.54430 | V12 = 70.2 |
| R13 = 0.00 | D13 = 1.50 | | | efl = 5.40  F number = 2.84  Full field = 60°  Back focal length = 6.28
object distance = 2400 mm

| | | | |
|---|---|---|---|
| R14 = 0.00 | D14 = 0.76 | N14 = 1.53338 | V14 = 61.3 |
| R15 = 0.00 | D15 = 0.78 | | | said lens being followed by a birefringent blur filter and array photodetector cover glass, as indicated by $R_{12}$–$R_{15}$ in the table, and being focusable by adjusting D5 and D11 such that their sum is constant.

* * * * *